United States Patent [19]

Okamura et al.

[11] 4,449,662
[45] May 22, 1984

[54] CORNER HOLDER FOR USE WITH BOXES

[75] Inventors: Kouichi Okamura, Fukuoka; Yukio Eriguchi, Dazaifu; Katsushige Hagio, Kasuga; Setsuo Yamamoto, Ashiya, all of Japan

[73] Assignee: Matsushita Electric Industrial Co., Osaka, Japan

[21] Appl. No.: 406,834

[22] Filed: Aug. 10, 1982

[51] Int. Cl.³ .......................... B65D 6/24; B65D 5/44
[52] U.S. Cl. ...................................... 229/49; 403/402; 217/69
[58] Field of Search ............................ 229/49; 217/69; 403/402, 401

[56] References Cited

U.S. PATENT DOCUMENTS 3,315,833  4/1967  Bell ........................................ 217/69

FOREIGN PATENT DOCUMENTS 2804406  8/1979  Fed. Rep. of Germany ........ 229/49
6414084  6/1966  Netherlands ........................... 229/49
411680  11/1966  Switzerland ........................... 229/49
430565  8/1967  Switzerland ........................... 217/69
2069464  8/1981  United Kingdom ................... 229/49

Primary Examiner—Herbert F. Ross
Attorney, Agent, or Firm—Pollock, VandeSande & Priddy

[57] ABSTRACT

A corner holder for use with a box of corrugated cardboard having a pair of slots in sidewalls thereof adjacent to a corner of the box, comprises a pair of inserts each including a tongue-shaped base plate and a U-shaped flange on the base plate, and a flexible connector web joined between the inserts. The base plate and the flange jointly define a channel or groove extending along opposite side edges and an arcuate bottom edge of the base plate. When the corner holder is installed on the box, the inserts are inserted in the slots, respectively, with edges of the sidewalls which define the slots being fitted in the grooves in the inserts. The corner of the box is thus clamped and reinforced by the corner holder. The box can readily be folded into a collapsed form simply by removing the inserts out of the slots.

16 Claims, 12 Drawing Figures

CORNER HOLDER FOR USE WITH BOXES

BACKGROUND OF THE INVENTION

The present invention relates to a corner holder for clamping corner flaps as of a corrugated cardboard box in superimposed relation to sidewalls of the box to form and reinforce an angular box corner.

It has been customary practice to assemble boxes as of corrugated cardboard by fastening corner flaps of the box to sidewalls thereof with stitches, an adhesive, or staples thereby forming and retaining a desired three-dimensional box shape. However, the boxes put together using such permanent or irremovable fastening means cannot be disassembled into a folded or collapsed form which is convenient for storage or shipment.

One conventional removable corner holder for assembling boxes comprises a right-angled channel body having a pair of ribs mounted respectively in channel arms of the body. When the known corner holder is mounted on a box, the corner holder is fitted over a corner of the box with the ribs inserted respectively in slots defined in sidewalls and flaps superimposed around the corner. During an assembling operation, the slots in the sidewalls and flaps are concealed from view by the corner holder, making it difficult for the ribs to find their way smoothly into the slots. The prior corner holder is also disadvantageous in that it tends to hit and peel off a layer of the box at a concealed inner portion of the corner, resulting in a reduction in the mechanical strength of the assembled box.

SUMMARY OF THE INVENTION

It is an object of the present invention to provide a corner holder for use with boxes, which will eliminate the prior difficulties.

Another object of the present invention is to provide a corner holder capable of easily assembling a box into a three-dimensional form.

Still another object of the present invention is to provide a corner holder for retaining a box reliably in its assembled form.

Still another object of the present invention is to provide a corner holder for assembling boxes, which is readily removable to allow an assembled box to be folded into a collapsed structure.

A still further object of the present invention is to provide a corner holder for use with boxes which has a flexible connector web capable of adapting the corner holder to different attachment positions.

A still further object of the present invention is to provide a corner holder which, when mounted on a box, will serve as a support for another box placed thereon.

A still further object of the present invention is to provide a box which is assembled with corner holders mounted on the corners of the box and easily collapsible with the corner holders removed.

According to the present invention, a corner holder for assembling a box includes a pair of inserts interconnected by a flexible connector web. Each of the inserts includes a tongue-shaped base plate and a U-shaped flange of an L-shaped cross section joined to the base plate, the base plate and flange jointly defining a groove extending along a peripheral edge of the base plate and opening peripherally outwardly. The inserts are inserted respectively in slots defined in sidewalls of the box ajacent to a corner thereof, with edges of the sidewalls which define the slots being fitted in the grooves. The corner of the box is thus clamped and reinforced by the corner holder. The assembled box can easily be folded into a collapsed form simply by pulling the inserts out of the slots. The flexible connector web has a plurality of stiffener ribs on its longitudinal edge which lies flush with or below edges of the inserts which lie flush with periphral edgs of the sidewalls of the box. With the longitudinal edge of the flexible connector web being disposed below the edges of the inserts, a smaller box can be fitted in the lower box and supported on the flexible connector webs of the corner holders installed on the lower box against lateral forces tending to shift the smaller box on the lower box. The flexible connector web with its longitudinal edge lying flush with the edges of the inserts allows an upper box plated on the box to be displaced thereon. According to another embodiment, each of the inserts has a pair of bearing plates closing ends of the groove and supported on shoulders of the slot when the insert is fitted in the slot. The bearing plates serve to prevent the insert from being forced under an increased load to bite into the sidewall beyond the bottom of the slot.

BRIEF DESCRIPTION OF THE DRAWINGS

The present invention will be described in detail by way of illustrative example with reference to the accompanying drawings, in which.

DETAILED DESCRIPTION

Figure 10:
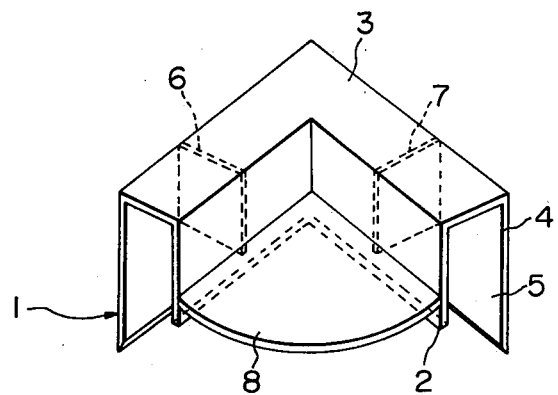
FIG. 10 is a perspective view of a conventional corner holder for use with a box.
Figure 11:
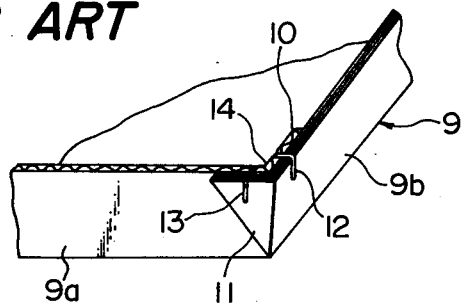
FIG. 11 is a fragmentary perspective view of a box on which the corner holder of FIG. 10 is to be mounted.
Figure 12:
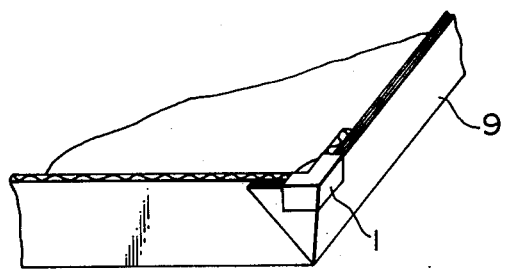
FIG. 12 is a fragmentary perspective view of the box of FIG. 11 which is assembled by the corner holder shown in FIG. 10.

FIGS. 10 through 12 illustrate a conventional corner holder 1 for use with a corrugated cardboard box 9. As shown in FIG. 10, the corner holder 1 comprises a right-angled channel body including an inner wall 2, an upper wall 3 and an outer wall 4 which jointly define a groove 5. The corner holder 1 also has a pair of stiffening and positioning plate ribs 6, 7 disposed respectively in channel arms of the right-angled channel body, and a sectorial corner plate 8 joined to the inner wall 2. As illustrated in FIG. 11, the box 9 on which the known corner holder 1 is to be mounted has a pair of sidewalls 9a, 9b including respective end flaps 10, 11 which are bent around a corner of the box into superimposed relation to the sideswalls 9b, 9a, respectively. A pair of vertical slots 12, 13 are defined in the sidewall 9b and the flap 10 and in the sidewall 9a and the flap 11, respectively. When the corner holder 1 is fitted over the corner of the box 9, as shown in FIG. 12, the plates ribs 6, 7 are inserted in the slots 12, 13, respectively, to retain the flaps 10, 11 and the sidewalls 9b, 9a together, thereby assembling the box 9.

During assembling operation, however, the plate ribs 6, 7 cannot smoothly be inserted into the slots 12, 13, respectively, since the slots 12, 13 are concealed from view by the corner holder 1. An inner portion 14 of the box corner is also concealed from view by the inner wall 2 of the corner holder 1 while the latter is being brought onto the box corner, even when the inner wall 2 hits the inner portion 14 during assembly. Therefore, the assembler tends to fail to notice the interferring engagement and forces the corner holder 1 all the way down peeling off a layer of the box 9 at the corner. Such damage results in a reduction in the mechanical strength of the assembled box 9.

Figure 1:
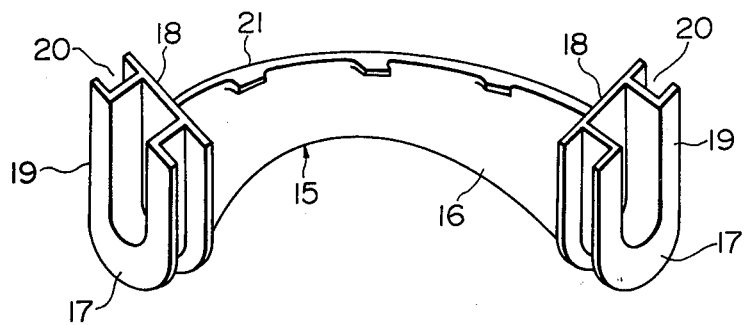
FIG. 1 is a perspective view of a corner holder for boxes according to an embodiment of the present invention.

FIG. 1 shows a corner holder 15 for boxes according to an embodiment of the present invention. The corner holder 15 is of a unitary structure which generally comprises a flexible connector web 16 and a pair of inserts 17, 17 joined integrally to the ends of the connector web 16. Each of the inserts 17, 17 is composed of a tongue-shaped base plate 18 attached to the connector web 16 and lying normal to the longitudinal axis thereof. A substantially U-shaped flange 19 of an L-shaped cross section is formed on the base plate 18 at a surface thereof facing away from the connector web 16. The flange 19 extends along opposite side edges and an arcuate lower edge of the base plate 18. The base plate 18 and the flange 19 jointly define a channel or groove 20 extending continuously along the side and lower edges of the base plate 18 and opening peripherally outwardly. The flexible connector web 16 has a plurality of longitudinally spaced stiffener ribs 21 on its upper edge. The upper edge of the connector web 16 lies slightly below upper edges of the inserts 17, 17. The flexible connector web 16 and the inserts 17, 17 are made of a flexible synthetic resin material such as polypropylene.

Figure 2:
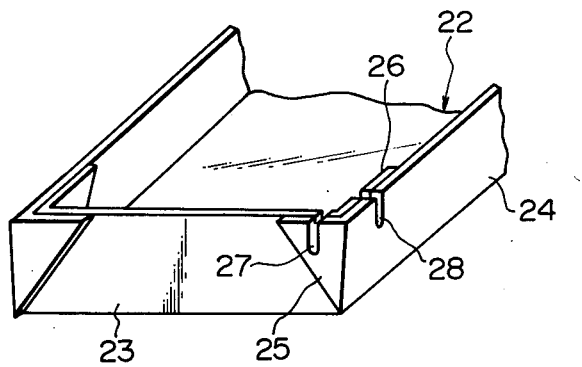
FIG. 2 is a fragmentary perspective view of a box with which the corner holder shown in FIG. 1 is to be used.

FIG. 2 illustrates a box 22 on which the corner holder 15 of FIG. 1 is to be mounted. The box 22 is normally made of corrugated cardboard and has adjacent sidewalls 23, 24 including respective end flaps 26, 25, respectively, bent around a corner of the box 22 into superimposed relation to the sidewalls 24, 23, respectively. The superimposed sidewall 23 and flap 25 have a vertical slot 27, and the superimposed sidewall 24 and flap 26 have a vertical slot 28, the vertical slots 27, 28 being located one on each side of the box corner.

Figure 3:
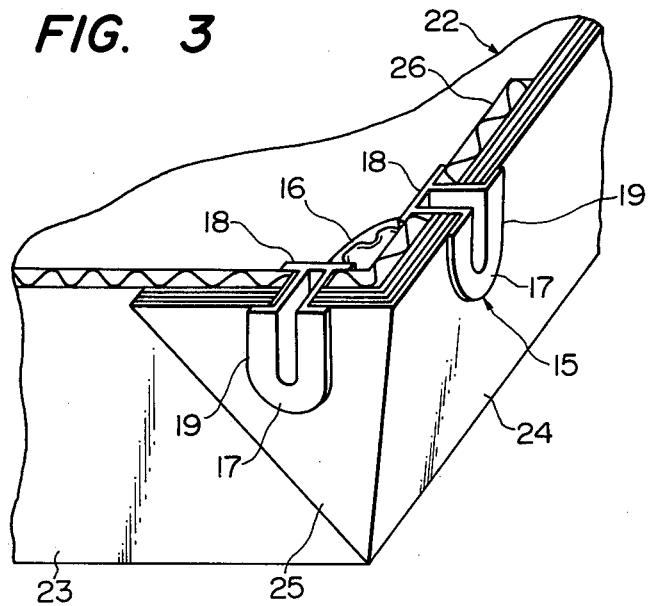
FIG. 3 is an enlarged fragmentary perspective view of the box of FIG. 2 on which the corner holder of FIG. 1 is mounted in place.

For installation of the corner holder 15 on the box 22, the inserts 17, 17 of the corner holder 15 are inserted all the way down into the slots 27, 28, respectively, as shown in FIG. 3, with edges of the sidewalls 23, 24 and flaps 25, 26 which define the slots 27, 28 being fitted in the grooves 20, 20 in the inserts 17, 17. The sidewall 23 and flap 25 and the sidewall 24 and flap 26 are clamped in position between the base plates 18 and flanges 19 of the inserts 17, 17. When the inserts 17, 17 are fully inserted in the slots 27, 28, the upper edges of the inserts 17, 17 lie flush with the upper peripheral edges of the sidewalls 23, 24 and flaps 25, 26. The corner holder 15 thus clamps and reinforces the corner of the box 22. The flexible connector web 16 extends within the assembled box 22 across the corner. Although not shown, corner holders of the same construction are mounted on the other three corners of the box 22 to assemble the latter into a desired three-dimensional shape. The assembled box 22 can easily be folded into a collapsed form by pulling the flexible connector web 16 upwardly to remove the inserts 17, 17 out of the slots 27, 28.

Figure 4:
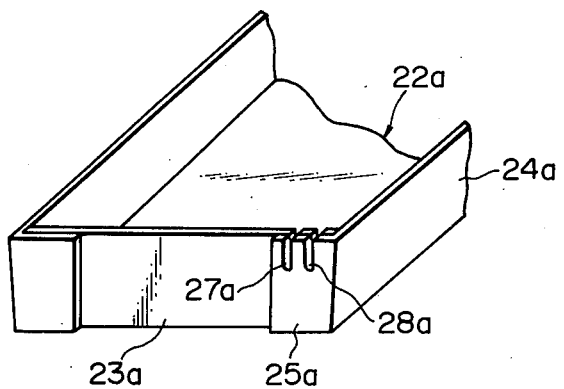
FIG. 4 is a fragmentary perspective view of another box with which the corner holder shown in FIG. 1 is to be assembled.
Figure 5:
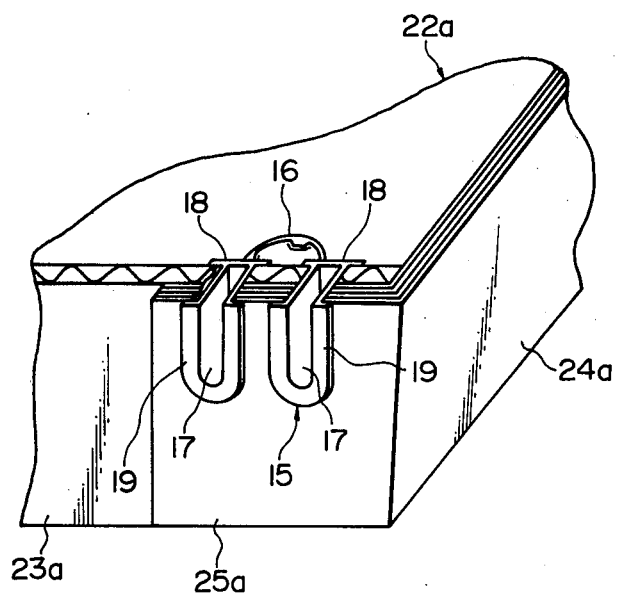
FIG. 5 is an enlarged fragmentary perspective view of the box illustrated in FIG. 3 on which the corner holder of FIG. 4 is mounted in position.

FIG. 4 is illustrative of another box 22a with which the corner holder 15 of FIG. 1 can be used. The box 22a includes adjacent sidewalls 23a, 24a, the sidewall 24a having an end flap 25a bent around a corner of the box 22a and superimposed on the sidewall 23a. A pair of vertial slots 27a, 28a are defined in the superimposed sidewall 23a and flap 25a on one side of the box corner. The corner holder 15 is mounted in position with the inserts 17, 17 fitted respectively in the slots 27a, 28a, as shown in FIG. 5.

Figure 6:
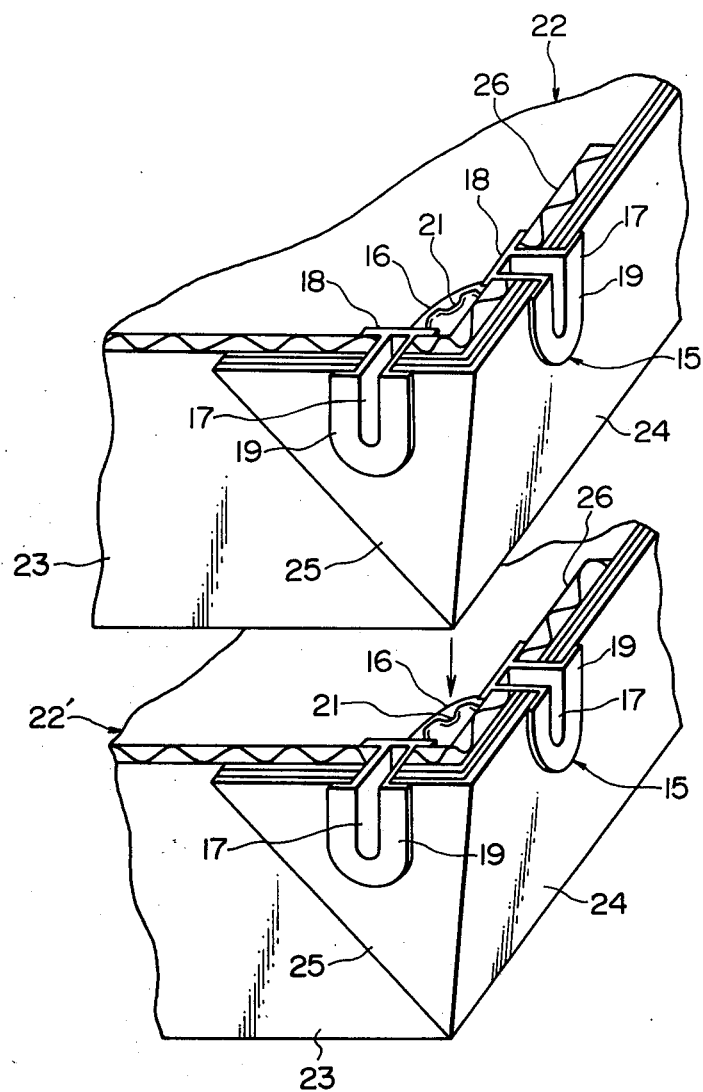
FIG. 6 is a fragmentary perspective view of boxes which are assembled by corner holders and to be placed one on the other.

In FIG. 6, a pair of upper and lower boxes 22, 22' are assembled by the corner holders 15, 15, respectively, according to the present invention, the upper box 22 being of a horizontal contour smaller than that of the lower box 22' such that the upper box 22 can be placed in the lower box 22' with a snug fit. When the upper box 22 is put on the lower box 22', the bottoms of the corners of the upper box 22 are supported on the flexible connector webs 16 of the corner holders 15 installed on the lower box 22'. Since the upper edge of the connector web 16 is lower than the upper edges of the inserts 17, 17, the upper box 22 is fitted in the lower box 22' stably against lateral forces tending to displace the upper box 22 horizontally with respect to the lower box 22'.

Figure 7:
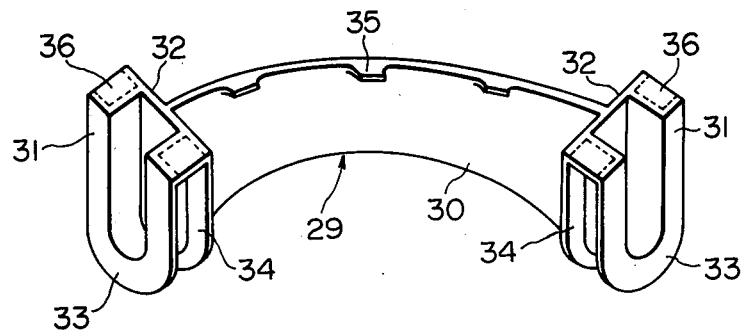
FIG. 7,is a perspective view of a corner holder for boxes according to another embodiment of the present invention.

FIG. 7 shows a corner holder 29 according to another embodiment of the present invention. The corner holder 29 includes a flexible connector web 30 and a pair of inserts 31, 31 integrally joined to the ends of the flexible connector web 30. Each of the inserts 31, 31 has a tongue-shaped base plate 32 lying normally to the longitudinal axis of the connector web 35 and a U-shaped flange 33 of an L-shaped cross section which extends along opposite side edges and an arcuate lower edge of the base plate 32. The base plate 32 and the flange 33 jointly define therebetween a continuous channel or groove 34 extending along the side and lower edges of the base plate 32 and opening peripherally outwardly. The flexible connector web 30 has a plurality of spaced stiffener ribs 35 on its upper edge which lies flush with the upper edges of the inserts 31, 31. Each of the inserts 31, 31 also includes a pair of bearing plates 36, 36 on its upper edge which close the upper ends of the groove 34 defined between the base plate 32 and flange 33. The corner holder 29 is made as of polypropylene.

Figure 8:
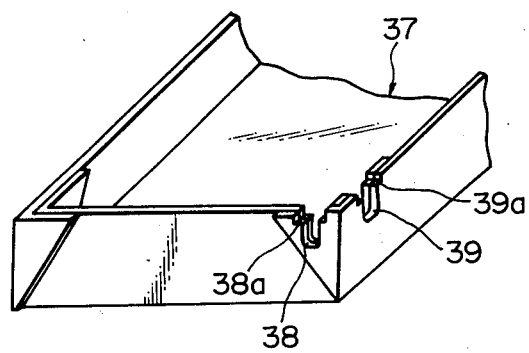
FIG. 8 is a fragmentary perspective view of a box with which the corner holder shown in FIG. 7 is to be used.
Figure 9:
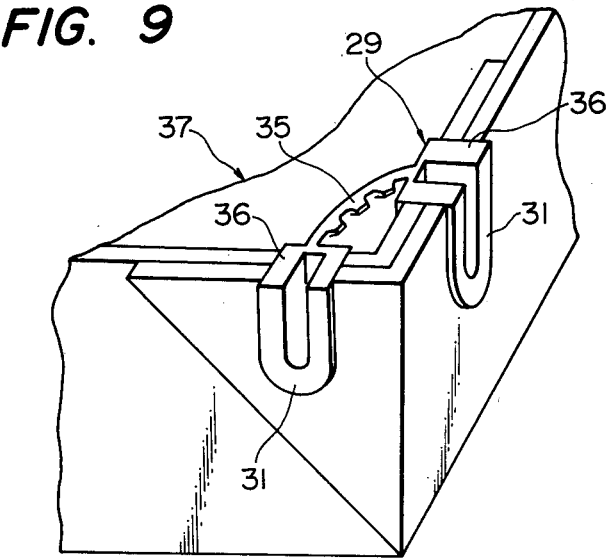
FIG. 9, is an enlarged fragmentary perspective view of the box of FIG. 8 on which the corner holder of FIG. 7 is mounted in place.

The corner holder 29 shown in FIG. 7 is mounted on a box 37 as illustrated in FIG. 8. The box 37 has a pair of slots 38, 39 one on each side of a corner of the box 37, the slots 38, 39 including shoulders 38a, 39a, respectively. In assembly, the inserts 31, 31 of the corner holder 29 are inserted respectively into the slots 38, 39 with the bearing plates 36, 36 received on the shoulders 38a, 39a. The corner of the box 37 is now clamped and reinforced by the corner holder 29 thus mounted. As shown in FIG. 9, the upper surfaces of the bearing plates 36, 36 of the corner holder 29 lie flush with the upper peripheral edges of sidewalls and flaps of the box 37. Since the upper edge of the flexible connector web 35 lies flush with the upper edges of the box 37, another box (not shown) which is placed on the box 37 will be prevented by the flexible connector web 35 from fitting into the box 37.

When a large load is imposed from above on the corner holder 29 installed on the box 37, the bearing plates 36 are pressed against the shoulders 38a, 39a to prevent the inserts 31, 31 from forcibly biting downwardly into the sidewalls and flaps beyond the bottoms of the slots 38, 39.

Although certain preferred embodiments of the present invention have been shown and described in detail, it should be understood that various changes and modifications may be made therein without departing from the scope of the appended claims.

What is claimed is:

1. A corner holder for use with a collapsible box including a plurality of sidewalls having end flaps bent around box corners into superimposed relation to adjacent ones of the sidewalls, said sidewalls and end flaps which are superimposed having a pair of slots adjacent to each of said corners, said corner holder comprising:
   a pair of inserts insertable substantially fully in the slots in the sidewalls of the box and each including a base plate having a substantially U-shaped peripheral edge and a continuous flange of an L-shaped cross section extending outwardly adjacent said peripheral edge, said base plate and said continuous flange jointly defining a substantially U-shaped groove opening outwardly along said U-shaped peripheral edge, said U-shaped groove being receptive of an edge of one of the slots in the sidewalls of the box when said insert is inserted in said slot; and
   a flexible web interconnecting the base plates of said inserts and adapted to be positioned inside of the box corner when said inserts are inserted respectively in the sidewalls of the box.

2. A corner holder according to claim 1, wherein said flexible web and said inserts are integrally joined to each other.

3. A corner holder according to claim 1, wherein said flexible web and said inserts are made of a flexible synthetic resin material.

4. A corner holder according to claim 3, wherein said flexible synthetic resin is polypropylene.

5. A corner holder according to claim 1, wherein said base plate lies normal to a longitudinal axis of said flexible web.

6. A corner holder according to claim 1, wherein each of said inserts has an edge adapted to lie flush with peripheral edges of the sidewalls of the box, said flexible web having a longitudinal edge lying flush with said edge of said inserts.

7. A corner holder according to claim 6, wherein each of said inserts includes bearing plates on said edge thereof which close ends of said groove.

8. A corner holder according to claim 1, wherein each of said inserts has an edge adapted to lie flush with peripheral edges of the sidewalls of the box, said flexible web having a longitudinal edge lying out of alignment with said edge of said inserts.

9. A corner holder according to claim 6 or 8, wherein said flexible web has a plurality of spaced stiffener ribs on said longitudinal edge thereof.

10. A corner holder according to claim 1, wherein said base plate is tongue-shaped and has opposite side edges and an arcuate edge extending therebetween, each of said inserts having a substantially U-shaped flange of an L-shaped cross section, said groove being defined between said base plate and said flange and extending continuously along said opposite side edges and arcuate edge 11. A collapsible box comprising:
    a plurality of sidewalls having end flaps bent around box corners into superimposed relation to adjacent ones of the sidewalls, said sidewalls and end flaps which are superimposed having a pair of slots adjacent to each of said corners, said slots being defined by edges of said sidewalls;
    a pair of inserts each having a base plate and a groove extending along a peripheral edge of said base plate and opening peripherally utwardly, said base plate having a substantially U-shaped peripheral edge and a continuous flange of an L-shaped cross section extending outwardly adjacent said peripheral edge forming said groove, said inserts being removably inserted respectively in said slots in the sidewalls with said edges thereof being received in the grooves of said inserts; and
    a flexible web interconnecting said pair of base plates.

12. A collapsible box according to claim 11, wherein each of said inserts has an edge lying flush with peripheral edges of the sidewalls of the box, said flexible web having a longitudinal edge lying flush with said edge of said inserts.

13. A corner holder according to claim 12, wherein each of said slots has shoulders, each of said inserts includes bearing plates on said edge thereof which close ends of said groove and are supported on said shoulders, respectively.

14. A corner holder according to claim 11, wherein each of said inserts has an edge lying flush with peripheral edges of the sidewalls of the box, said flexible web having a longitudinal edge lying below said edge of said inserts.

15. A collapsible box according to claim 11, wherein said pair of slots are located one on each side of each of said corners.

16. A collapsible box according to claim 11, wherein said pair of slots are located on one side of each of said corners.

* * * * *

UNITED STATES PATENT AND TRADEMARK OFFICE
CERTIFICATE OF CORRECTION

PATENT NO. : 4,449,662

DATED : May 22, 1984

INVENTOR(S) : Kouichi Okamura, et al.

It is certified that error appears in the above-identified patent and that said Letters Patent is hereby corrected as shown below:

In the heading, section number 73, after "Industrial"

delete "Co." and insert --Company, Limited--.

Signed and Sealed this

Sixteenth Day of October 1984

[SEAL]

Attest:

*Attesting Officer*

GERALD J. MOSSINGHOFF

*Commissioner of Patents and Trademarks*